United States Patent
McCoy

(10) Patent No.: US 8,733,560 B2
(45) Date of Patent: May 27, 2014

(54) ULT CABLE SUPPORT SYSTEM

(71) Applicant: Donald P. McCoy, Lake Forest, IL (US)

(72) Inventor: Donald P. McCoy, Lake Forest, IL (US)

(73) Assignee: Underground Devices, Inc., Northbrook, IL (US)

( * ) Notice: Subject to any disclaimer, the term of this patent is extended or adjusted under 35 U.S.C. 154(b) by 0 days.

(21) Appl. No.: 14/040,666

(22) Filed: Sep. 28, 2013

(65) Prior Publication Data
US 2014/0027603 A1    Jan. 30, 2014

Related U.S. Application Data

(63) Continuation of application No. 13/556,070, filed on Jul. 23, 2012, now Pat. No. 8,550,259.

(51) Int. Cl.
*A47F 7/00*    (2006.01)

(52) U.S. Cl.
USPC ............ 211/13.1; 211/60.1; 211/193; 248/73

(58) Field of Classification Search
USPC ............ 211/13.1, 60.1, 64, 70.4, 70.8, 87.01, 211/89.01, 90.02, 94.02, 96, 99–105, 168, 211/171, 173, 174; 248/59, 73, 243, 244, 248/221.11, 223.31, 562
See application file for complete search history.

(56) References Cited

U.S. PATENT DOCUMENTS

| | | |
|---|---|---|
| 318,343 A | 5/1885 | Baublits |
| 918,039 A | 4/1909 | Grundmann |
| 998,112 A * | 7/1911 | Murray ................ 174/158 R |
| 1,129,553 A | 2/1915 | Cope |
| 1,372,180 A | 3/1921 | McFadden |
| 1,473,817 A | 11/1923 | Gorsline |
| 1,622,741 A | 3/1927 | Seeger |
| 1,656,211 A | 1/1928 | Leudinghous |
| 1,657,939 A | 1/1928 | Rockwell |
| 1,764,766 A | 6/1930 | White |
| 1,775,391 A | 9/1930 | Fassinger |
| 1,830,438 A | 11/1931 | Miller |
| 1,983,470 A | 12/1934 | Knape |
| 2,050,510 A | 8/1936 | Thoms et al. |
| 2,218,894 A | 10/1940 | Schlosser |
| 2,266,206 A | 12/1941 | Jackson et al. |
| 2,285,632 A | 6/1942 | Urbain |
| 2,336,604 A | 12/1943 | Edward et al. |

(Continued)

OTHER PUBLICATIONS

Hubbell/Chance Underground Cable Racks, Centralia, Missouri, from web site, dated Dec. 2002, Bulletin 5-54.7 (1 page).

(Continued)

*Primary Examiner* — Korie H Chan

(57) ABSTRACT

A cable rack arm and support system suitable for underground power and communication service is made from reinforced non-metallic polymers that will not rust or corrode. A cable rack arm up to thirty inches long may be compression molded with long glass fibers in a polyester or vinylester matrix. Each cable rack arm is securely mounted to a non-metallic stanchion that may be made from a reinforced, pultruded composite material. Nonmetallic pins may be used to secure the cable rack arms to the stanchions. Each cable rack arm then supports one or more cables in cable saddles that are snap-fit atop the arm, thus keeping the cables accessibly organized in a manhole, tunnel or vault. Each saddle may include elastomeric dampening material to reduce shock and vibration in the mechanical and electrical environment in underground tunnels, vaults and manholes.

21 Claims, 8 Drawing Sheets

(56) References Cited

U.S. PATENT DOCUMENTS

| | | | |
|---|---|---|---|
| 2,997,269 A | 8/1961 | Urbain et al. | |
| 3,164,255 A | 1/1965 | Jay | |
| 3,212,648 A | 10/1965 | Baker, Jr. et al. | |
| 3,233,852 A | 2/1966 | Azar | |
| 3,355,132 A | 11/1967 | Jenkins | |
| 3,371,798 A | 3/1968 | D'Altrui | |
| 3,503,519 A | 3/1970 | Jay | |
| 3,512,654 A | 5/1970 | Olsen et al. | |
| 3,601,432 A | 8/1971 | Fenwick et al. | |
| 3,689,015 A | 9/1972 | Johnson | |
| 3,730,108 A | 5/1973 | Stroh | |
| D228,737 S | 10/1973 | Mathews | |
| 3,784,025 A | 1/1974 | Dumit | |
| 3,787,016 A | 1/1974 | Laval, Jr. | |
| 3,863,900 A | 2/1975 | Dagiel et al. | |
| 3,888,440 A | 6/1975 | Rebentisch | |
| 3,888,441 A | 6/1975 | Rebentisch | |
| 3,900,110 A | 8/1975 | Soroka | |
| 3,923,277 A | 12/1975 | Perrault et al. | |
| 4,013,253 A | 3/1977 | Perrault et al. | |
| 4,032,096 A | 6/1977 | Perrault et al. | |
| 4,181,279 A | 1/1980 | Perrault et al. | |
| D261,960 S | 11/1981 | Mathews | |
| 4,324,379 A | 4/1982 | Ovitz, III | |
| 4,387,872 A | 6/1983 | Hogue | |
| 4,406,374 A | 9/1983 | Yedor | |
| 4,444,323 A | 4/1984 | Travis | |
| 4,494,896 A | 1/1985 | DiFranco | |
| 4,684,097 A | 8/1987 | Cox | |
| 4,709,888 A | 12/1987 | Cubit et al. | |
| 4,787,583 A | 11/1988 | Morton | |
| 4,960,253 A | 10/1990 | Perrault et al. | |
| 5,022,621 A | 6/1991 | Quest | |
| 5,092,546 A | 3/1992 | Wolfbauer | |
| 5,118,060 A * | 6/1992 | Spronken | 248/218.4 |
| 5,253,837 A | 10/1993 | Loux | |
| 5,538,213 A | 7/1996 | Brown | |
| 5,592,886 A | 1/1997 | Williams et al. | |
| 5,695,163 A | 12/1997 | Tayar | |
| 5,876,000 A * | 3/1999 | Ismert | 248/65 |
| 6,024,333 A | 2/2000 | Raasch et al. | |
| 6,082,690 A | 7/2000 | Durin et al. | |
| 6,126,122 A * | 10/2000 | Ismert | 248/74.1 |
| 6,129,224 A | 10/2000 | Mingers | |
| 6,196,141 B1 | 3/2001 | Herron et al. | |
| 6,663,201 B2 | 12/2003 | Herron et al. | |
| 7,140,500 B2 | 11/2006 | McCoy | |
| D538,634 S * | 3/2007 | King | D8/380 |
| 2004/0084584 A1 | 5/2004 | Lin | |
| 2004/0094496 A1 | 5/2004 | MacDonald | |
| 2004/0104322 A1 | 6/2004 | Hennequin | |
| 2006/0222837 A1 | 10/2006 | Kismarton | |
| 2011/0062292 A1 | 3/2011 | McCoy | |
| 2011/0062293 A1 | 3/2011 | McCoy | |

OTHER PUBLICATIONS

Hubbell/Chance Underground Cable Racks, Centralia, Missouri, from web site, dated Dec. 2002, Bulletin 5-54.17 (1 page).

Hubbell/Chance Underground Cable Racks, Centralia, Missouri, from web site, dated May 2006, pp. 5-41-5-43 (3 pages).

Highline Products, Lexington, MA, from web site, undated, HL-35 Underground Cable Support Bracket (1 page).

Inwesco Inc., Azusa, CA, from web site, undated, literature concerning underground cable rack hooks, cable racks, insulators, stanchions (9 pages).

Com-U-Tech, Marlton, NJ, from web site, undated, literature concerning cable rack arms and stanchions (2 pages).

Aikinstrut, Harvey, IL, from web site, undated, literature concerning pipe supports, power-rack stanchions and cable rack arms (3 pages).

Undated literature from unknown source, possibly Alabama Power or other, concerning cable rack arms and stanchions (5 pages).

* cited by examiner

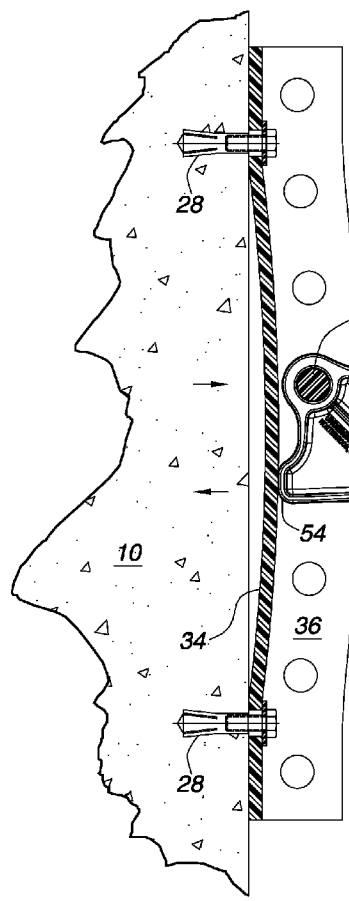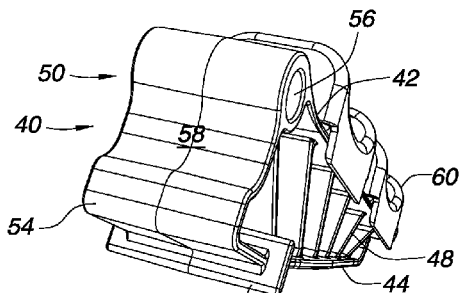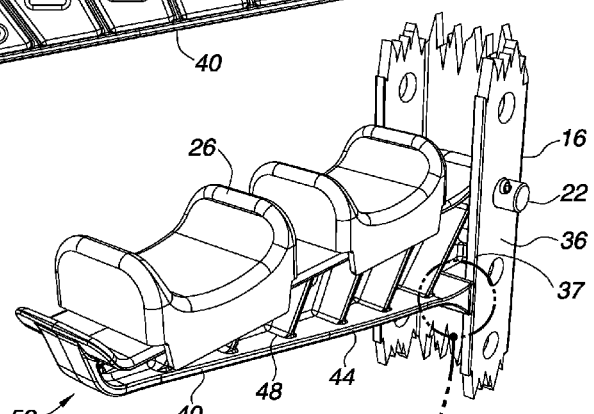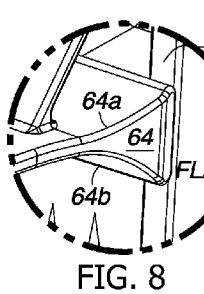

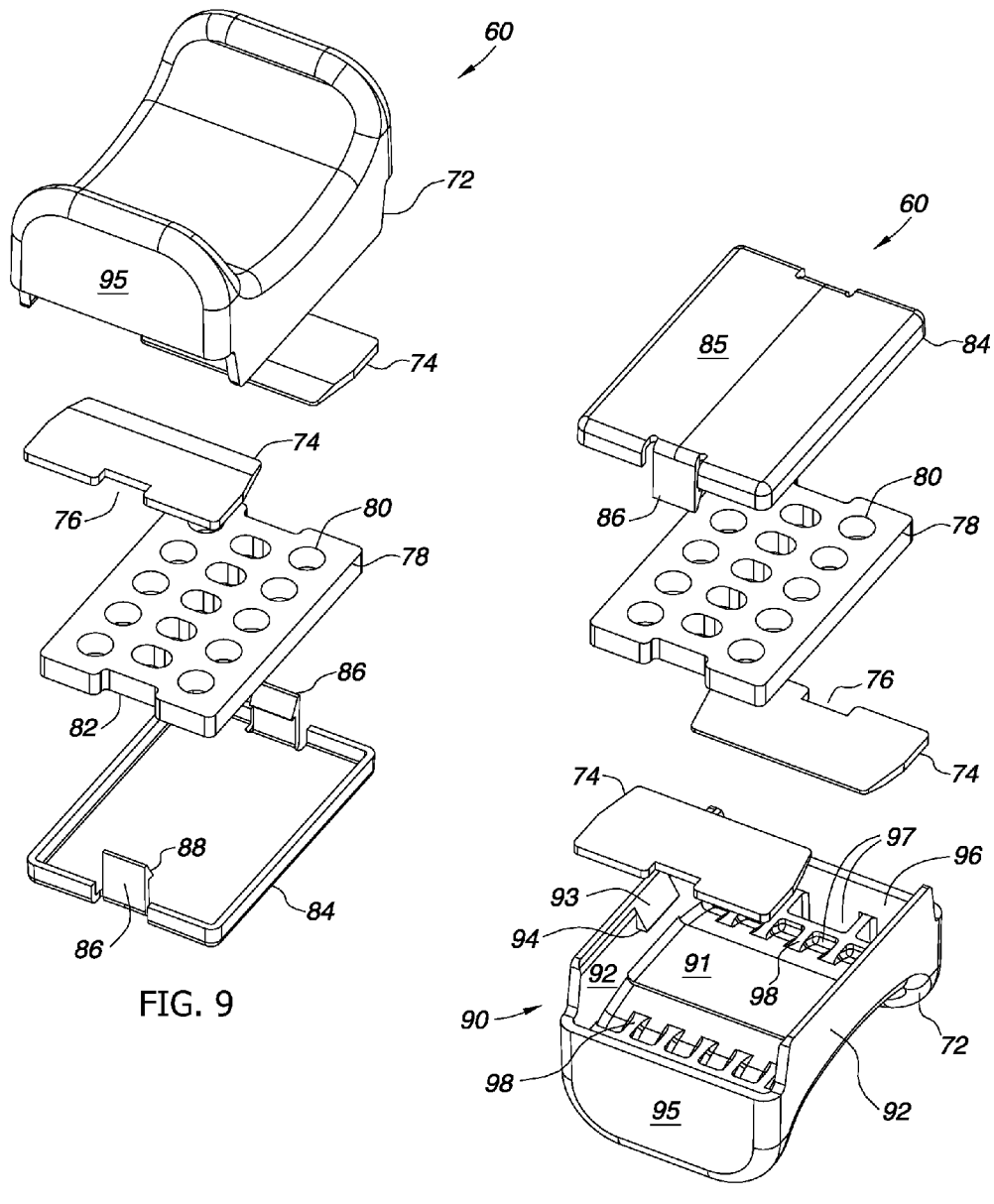

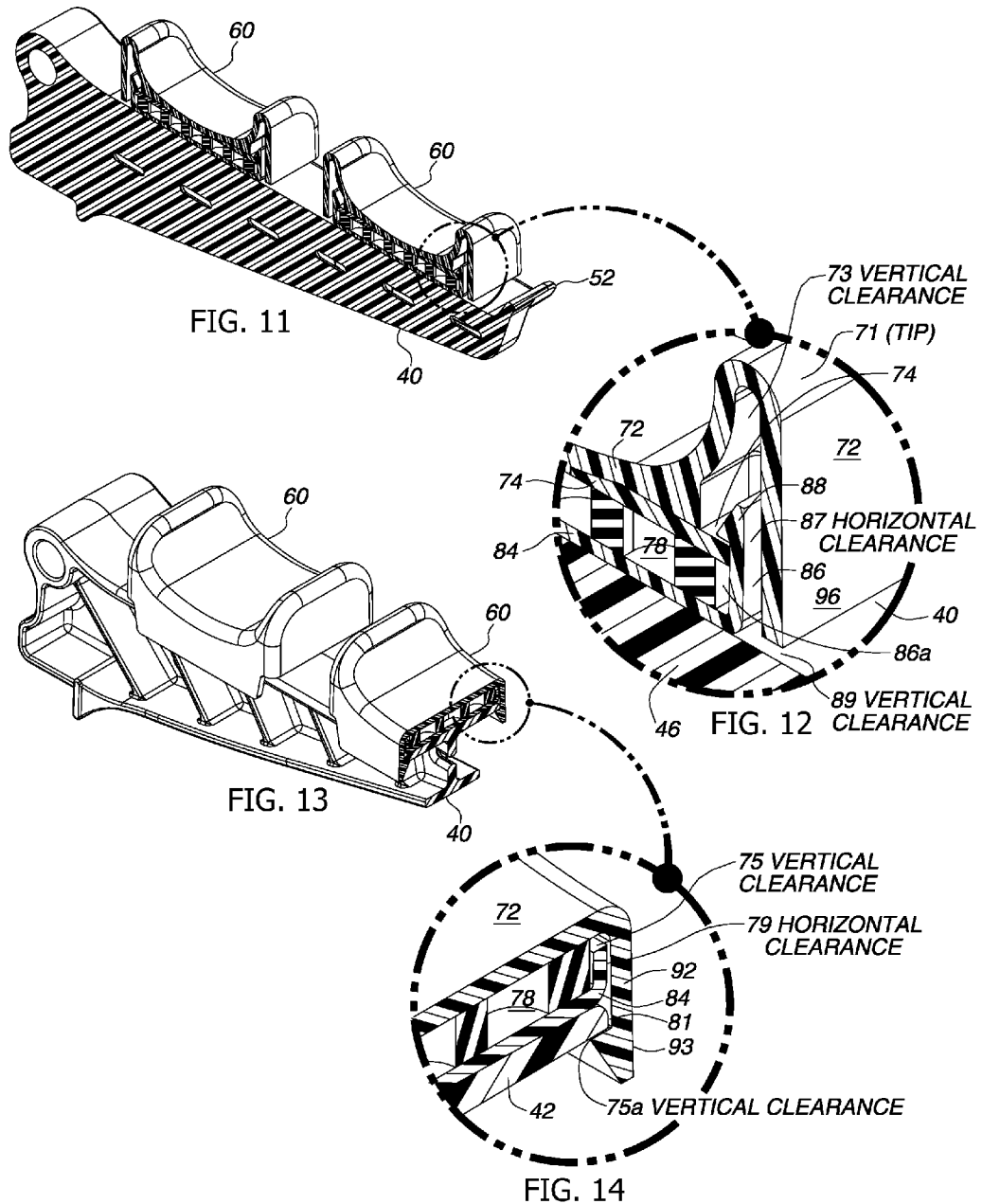

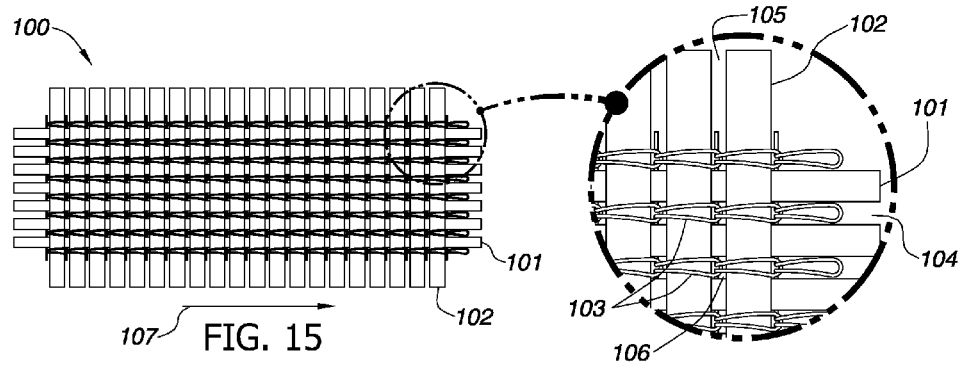
FIG. 15
FIG. 16
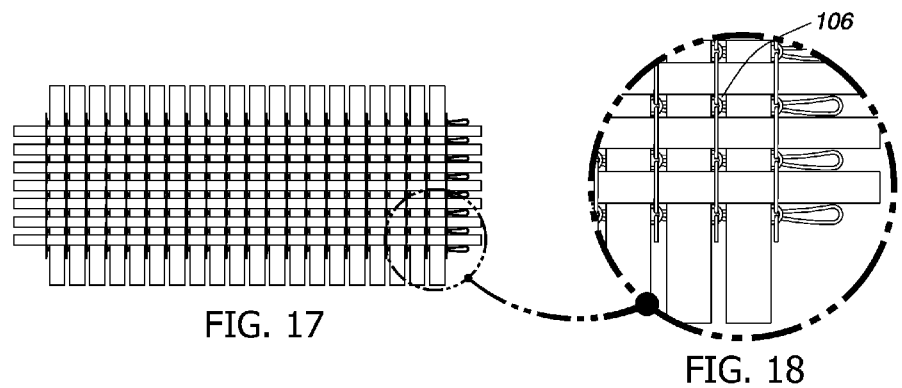
FIG. 17
FIG. 18
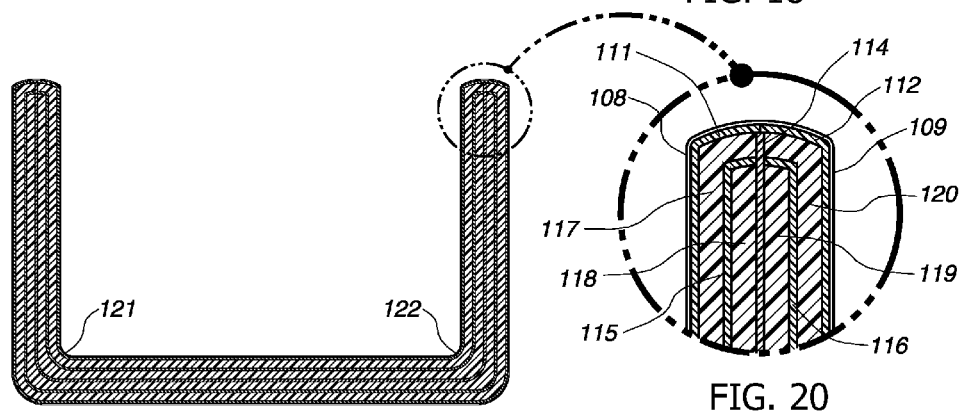
FIG. 19
FIG. 20

ULT CABLE SUPPORT SYSTEM

CLAIM TO PRIORITY

The present application is a continuation of U.S. patent application Ser. No. 13/556,070, filed Jul. 23, 2012, of the same title, which is hereby incorporated by reference in its entirety.

TECHNICAL FIELD

The technical field of the invention is that of racks for supporting power and communication cables in underground manholes, vaults, and tunnels.

BACKGROUND

This disclosure begins with a brief discussion of why manholes, vaults and tunnels exist. In the modern world of the twenty-first century, we require electricity and communications for all aspects of industry and for our daily lives. Without them, our existence would be just as it was before the Industrial Revolution. All electricity not generated on site, as with local generators and solar panels, is transmitted and distributed through copper and aluminum cables. All communications that extend beyond the distance a person's voice can carry are transmitted at some point, and for the most part, through copper conductive cables or glass fiber cables. There are billions of miles of cables extending to almost every place and every point on planet Earth.

Our dependence on electricity and communications demands a network of cables that is, if not flawless, at least very close to flawless. The largest portions of our power and communications cables are suspended overhead from poles and towers. The overhead network includes much redundancy and many checks and balances to keep it reliable, but inherently there are weaknesses. Overhead cables are prone to the destructive forces of weather. Storms, high winds, ice, hurricanes, tornadoes, etc., wreak destructive forces that knock down overhead lines and interrupt electrical and telephone service. In many places, overhead cables are not desirable, such as over waterways, at and near airports or over major highways, just to name a few. Overhead cables are unsightly. We don't want them in the congested areas of major cities, on school campuses, in upscale residential neighborhoods, etc.

To overcome deficiencies in overhead power and communications lines, some are directly buried in the ground in areas where a cable interruption would not be a catastrophic event and in areas where the possibility of inadvertently cutting of the cable is low. Mission critical underground cables are buried in concrete encased duct banks. Manholes, which are underground concrete rooms that can be accessed through a normally-round steel cover located in the manhole ceiling, are located along cable runs at points where the cables are connected, spliced and redirected for delivery of power and communications to customers. It is estimated that there are over 28,000 power manholes in the city of Chicago alone.

Cable supports are used to organize and support medium voltage power distribution cables in underground manholes, vaults, and tunnels. Cable supports are also used to organize and support underground low voltage power cables and control cables, high voltage power transmission cables, and communication cables. Cable supports may also be used above ground and in areas other than underground manholes, vaults and tunnels.

The underground environment may be less hostile in some ways, but the history of underground cables suggests that the underground environment is not benign. The environment in underground power and communications manholes is indeed harsh. While there may be fewer ultraviolet rays and less severe weather underground, and the temperature is more constant, moisture and humidity are always present. There are other considerations, such as the constant and higher danger from flooding, and underground pests that consider electrical insulation, and even steel, a tasty treat. Manholes may fill with water that is often contaminated with sewage, fertilizer runoff, tree roots, and chemicals, including caustic materials. Very harsh sea or salt water sometimes fills manholes. Many manholes are completely or partially filled with such contaminated water all of the time, except when pumped out for maintenance. Others fill periodically but are hot and have extremely high humidity, while still others fill and empty with ocean tides.

As noted, most power and communications manholes are partially or completely full of water some of the time or all of the time. The amount of water in a given manhole is influenced by location, surrounding conditions, drainage, and weather. Manholes located at higher grades generally will be filled with less water for a shorter period of time than those located at lower grades. Manholes located where the surrounding area has a high ground water level and/or a high amount of rain generally are filled with water to a higher level and more of the time than those located in areas that have a low surrounding ground water level and/or a low amount of rain. The water level in manholes located close to the ocean often changes with the tide, and the constantly-changing interface only increases the likelihood for corrosion. The condition of water in underground power and communications manholes occasionally is fresh and clean but most often is contaminated, as noted above, or is salt water, both of which can be very corrosive and also conductive.

Communication and power cables should be kept off surfaces, such as a floor or the ground, and should be organized and protected to the greatest extent possible. Cables are thus typically supported underground by racks that elevate cabling and keep the cabling off the ground, thus shielding the cables from at least some of the worst underground dangers. Racks for supporting cables must be able to withstand both heat and cold, all conceivable temperatures and humidities in every combination. In addition, the racks must be able to support very heavy loads from power and communication cables. The racks themselves are preferably supported, e.g., attached to a wall, rather than free-standing structures. Thus, the racks will have penetrations, or stress concentrators, to deal with, in these hot, humid, and stressful environments, along with the high loads expected from supporting cabling. The walls themselves may have penetrations for supporting bolts, pins or other fasteners used to secure the racks in place. The walls, such as concrete walls or other structures, will also be in intimate contact with the racks, adding their chemical potential for corrosion to the racks.

All these stresses combine to make the underground a challenging environment for cable racks. For the most part, existing cable supports used in underground manholes, vaults, and tunnels are manufactured using steel stampings, steel forms, or steel weldments. They may also be ductile iron castings. After the supports are stamped, formed, welded, or cast, they are hot dip galvanized in an effort to prevent corrosive deterioration. The steel arms and posts are bonded together and grounded in an attempt to prevent corrosion. Eventually, the galvanized coating is consumed and the steel racks may oxidize or corrode away, leaving the power and communications cables without support.

Two phenomena, galvanic corrosion and stray current corrosion, occur in flooded underground manholes to cause this deterioration. Galvanized steel cable supports are very vulnerable to both galvanic and stray current corrosion and often become severely corroded to a point that they will no longer support the cables in a very short period of time.

Galvanic corrosion is an electrochemical process in which one metal, the anode, corrodes preferentially when in electrical contact with a different type of metal, the cathode, and both metals are immersed in an electrolyte. In flooded underground power and communications manholes the galvanized steel cable supports are the anodic sites of the galvanic corrosion reaction. Cathodic parts in the manhole, parts made from more noble metals such as stainless steel, may be damaged in the galvanic corrosion process due to generation of electrolytic hydrogen on their surfaces causing hydrogen embrittlement. Stray current corrosion of underground power and communication cable supports is usually caused by power and communications manholes being located in the vicinity of electric rail tracks, pipe lines that are cathodically protected or the like.

Underground galvanized steel cable supports that are severely corroded and can no longer support the cables result in power and communications interruptions and a safety hazard to technicians who enter the manhole. Another safety issue is that galvanized steel cable supports are conductive. If a power cable's insulation is compromised and the electrified conductor contacts a galvanized steel cable support, the cable support is energized. If a technician inadvertently touches the energized cable support he may be electrocuted.

An additional concern for the underground environment is the shock and vibration that occur in the surrounding area which is transmitted to the cables. The shock and vibration are generated by heavy vehicular traffic in the roadways over and near manholes. This may include trucks and railroad traffic in the area of the manholes, and may also include construction traffic in certain areas. Better ways are needed to dampen vibrations before they reach the cables.

What is needed are cable racks better able to withstand the environment and better adapted to a greater variety of situations, for fewer stresses and for longer service.

SUMMARY OF THE INVENTION

One embodiment is a cable rack arm. The cable rack arm includes an upper flanged portion formed between a proximal end and a distal end of the cable rack arm, a lower portion opposite the upper portion, a web connecting the upper flanged portion to the lower portion and an interface near the proximal end. The interface includes: i. a gusset formed perpendicularly to a length of the cable rack arm for mating with a front face of a stanchion for mounting the cable rack arm; and ii. an orifice for supporting cable loads, wherein an area surrounding the orifice forms a continuous surface connected to the upper flanged portion and spanning a width of the cable rack arm.

Another embodiment is a cable rack arm. The cable rack arm includes an upper flanged portion formed between a proximal end and a distal end of the cable rack arm. The cable rack arm also includes a lower portion opposite the upper portion, the lower portion further comprising a gusset formed perpendicularly to a length of the cable rack arm, the gusset adapted for mating with flanges of a stanchion for mounting the cable rack arm, the gusset formed between the distal and proximal ends of the cable rack arm. The cable rack arm also includes a web connecting the upper flanged portion to the lower portion and an interface near the proximal end for mounting to the stanchion.

Another embodiment is a cable rack arm. The cable rack arm includes an upper flanged portion formed between a proximal end and a distal end of the cable rack arm, and a lower portion opposite the upper portion, the lower portion further comprising a gusset formed perpendicularly to a length of the cable rack arm, the gusset adapted for mating with flanges of a stanchion for supporting cable loads, the gusset formed between the distal and proximal ends of the cable rack arm. The cable rack arm also includes a web connecting the upper flanged portion to the lower portion and an interface near the proximal end, the interface including: i. a heel for mating with a stanchion for mounting the cable rack arm, the heel comprising a continuous element spanning a width of the cable rack arm; ii. an orifice for mounting the cable rack arm to the stanchion, wherein an area surrounding the orifice forms a continuous surface spanning the width of the cable rack arm; and iii. a hollow area between the heel and the orifice, the hollow area formed between continuous, gently-sloped surfaces.

Yet another embodiment is a cable rack arm. The cable rack arm includes an upper flanged portion formed between a proximal end and a distal end of the cable rack arm and a lower flanged portion opposite the upper flanged portion, the lower flanged portion further comprising a gusset formed perpendicularly to a length of the cable rack arm, the gusset adapted for mating with flanges of a stanchion for supporting cable loads, the gusset formed between the distal and proximal ends of the cable rack arm. The cable rack arm also includes a web connecting the upper flanged portion to the lower flanged portion, an interface near the proximal end for mounting to the stanchion, and a non-metallic saddle configured to snap-fit onto the cable rack arm.

While the invention will be described in connection with certain preferred embodiments, there is no intent to limit it to those embodiments. The intent is to cover all alternatives, modifications and equivalents as included within the spirit and scope of the invention as defined by the appended claims.

BRIEF DESCRIPTION OF THE DRAWINGS

FIG. 5 is a partial cross-sectional side view of the arm of FIG. 4 in a deployed position, depicting applied stress.

FIG. 6 is a rear perspective view of the arm of FIG. 2.

FIG. 7 is a front perspective view of the cable rack arm of FIG. 2 showing the interface between the cable rack arm and the stanchion.

FIG. 8 depicts a closer view of the interface, with details of the lower gusset.

FIGS. 9 & 10 depict exploded top and bottom views of a saddle embodiment of FIG. 1.

FIG. 11 depicts a side perspective, cross-sectional view of the cable rack arm and saddle of FIG. 1.

FIG. 12 depicts a closer view of a front portion of the saddle of FIG. 11.

FIG. 13 depicts an additional partial front cross-sectional view of the cable rack arm and saddle of FIG. 11.

FIG. 14 depicts a closer partial cross-sectional view of the saddle of FIG. 13.

FIG. 15 is a top view of a fiberglass cross layered knitted apertured mat.

FIG. 16 is a closer detail view of the embodiment in FIG. 15.

FIG. 17 is a bottom view of the embodiment of FIG. 15.

FIG. 18 is a closer detail view of the embodiment of FIG. 17.

FIG. 19 is a cross-sectional view of a non-metallic C-channel stanchion.

FIG. 20 is a closer view of the embodiment of FIG. 19.

DETAILED DESCRIPTION

Figure 1:
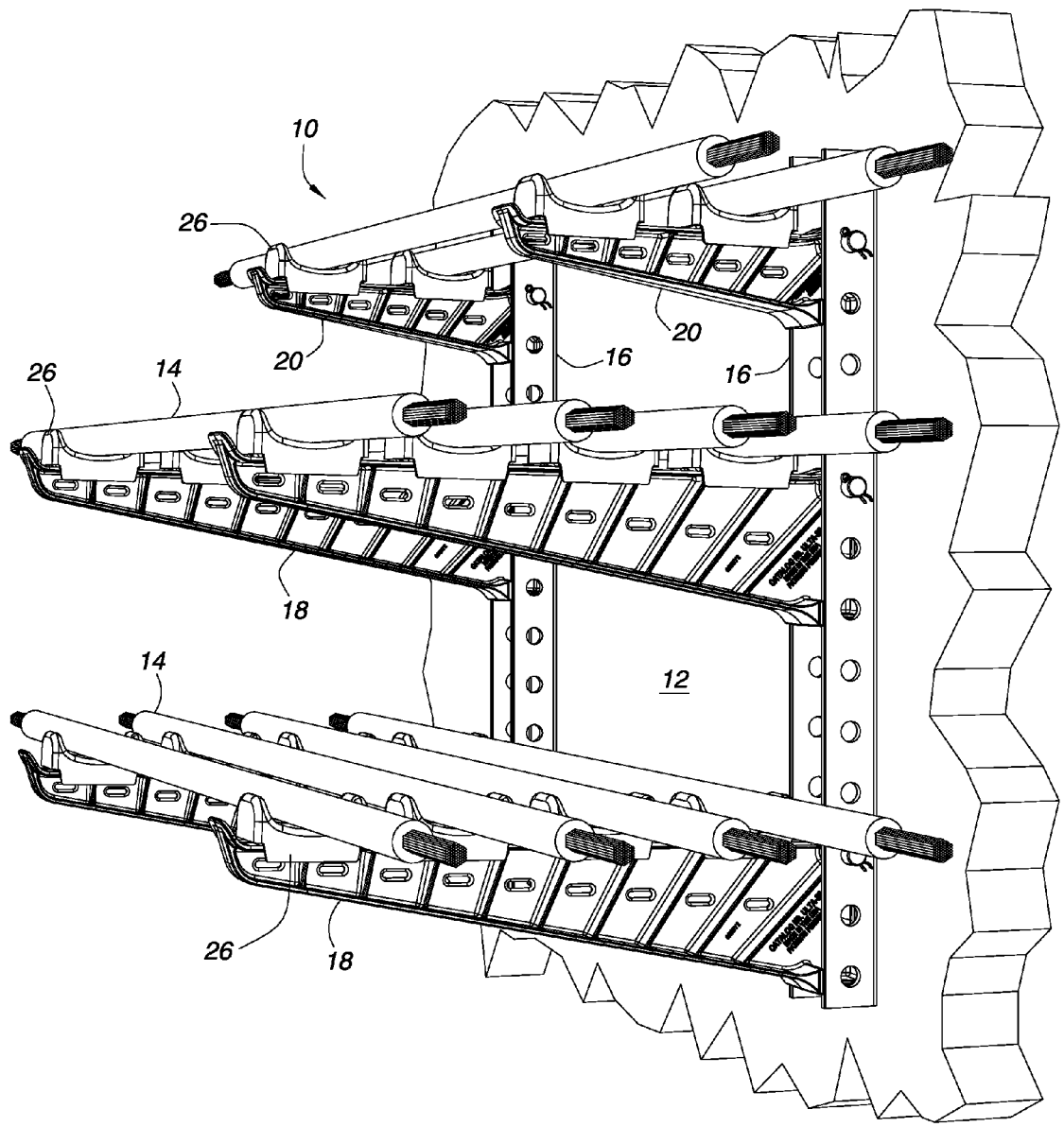
FIG. 1 is a perspective view of stanchions with cable rack arms in a typical underground installation with embodiments of the present invention.

Embodiments of the cable arms and saddles described herein are preferably molded from plastic materials. In this context, "plastic" materials include any resinous, thermoset, or thermoplastic materials, including materials that are reinforced or otherwise altered, and which are formed by molding. Thus, in one embodiment, nylon with short or long glass fibers is used to make strong, stiff, and environmentally-resistant rack arms. In the present context, short glass fibers intends glass fibers from about ⅛" (about 3 mm) long to about ¼" (about 6 mm) long. Long glass fibers, from about 3/16" (about 5 mm) to about ⅜" (about 10 mm) or longer, may be used instead for greater strength and stiffness. Glass fibers with diameters from about 0.009 mm (0.00035 in) to about 0.011 mm (0.00043 in) may be used for reinforcement. Fibers with other diameters may also be used.

In one embodiment, cable rack arms as described below may be compression-molded with 50% long glass fibers. Other proportions of resin and fibers may be used. These arms have a rated capacity of 250 lbs, measured 1 inch from the outermost tip. The arms have an ultimate capacity of 1000 lbs when loaded 1 inch from the outermost tip of the arm. In one embodiment, the glass-reinforced compounds from which the arms are molded has a dielectric strength of 460 V/mil when tested under the ASTM-D-149 standard.

Other applications may use other materials, such as polyethylene or polypropylene, for applications in which not as much strength is required, and especially if materials with low friction are desired. For example, portions of the saddles are desirably made from high-density polyethylene (HDPE), fluorinated compounds such as polytetrafluoroethylene (PTFE), UHMW-types of polyethylene, and polypropylene (PP), among others. The plastic materials may also include particulate fillers, such as aluminum oxide or calcium carbonate, or any other filler useful in plastics molding.

In addition to cable arms, the stanchions may also be molded from non-metallic materials. Stanchions may be injection molded, thermoformed, transfer molded, compression molded, or even pultruded. Typical polymers or resins include polyester, such as standard polyester, fire-retardant polyester, vinyl ester and fire-retardant vinyl ester. In embodiments, polyester resins may be used to yield stanchions or cable arms having an Underwriters Laboratories V0 flame resistance, in addition to low smoke. These ratings add to the safety of these devices in case of fire in manholes or other underground installations.

In addition to a thermoplastic or thermoset resin, the stanchions may include reinforcement, such as glass fibers. Parts that are discretely molded, one at a time, may include chopped or short glass fibers, as mentioned above. These parts or parts that are pultruded may also be made with unidirectional fiberglass roving, continuous strand multidirectional glass fiber mat and stitched woven fiberglass roving. The reinforcements add longitudinal and transverse strength and stiffness. An outer surface veil mat may also be used to add UV resistance and hand-friendliness to the resin-rich surface. If greater strength or stiffness is desired, carbon fiber reinforcement may also be used in addition to or in lieu of glass.

Pultruded C-channels are made with various loadings of reinforcement. In one embodiment, the reinforcement may include from about 30 to about 40 weight % unidirectional fiberglass roving and from about 10 to about 25 weight % continuous multidirectional glass fiber mat. Examples include 33% unidirectional roving and about 17% continuous multidirectional glass fiber mat. Higher or lower loadings of reinforcement may be used. The mat is believed to especially increase the strength and stiffness of the corners of the pultrusion. In other embodiments, unidirectional roving is stitched together with transverse glass or cotton fibers to form a stitched woven fiberglass roving. The stitching helps to orient and control the roving and make it easier to pull into the tooling. The proportion of the reinforcements may vary within reasonable limits consistent with the desired strength and stiffness, e.g., from about 35% to 65%, or even higher. In other embodiments, only the continuous multidirectional glass fiber mat may be used. In still other embodiments, other forms and orientations of reinforcement may be used. All are intended to be within the scope of the present disclosure. A few specific embodiments are discussed below with reference to FIGS. 15-20.

The pins used to mount the cable rack arms to stanchions may also be molded from plastic materials. The pins are desirably injection molded, but they may also be compression molded, pultruded and/or machined. It will be clear to those with ordinary skill in the art that the pins support a shear load caused by the cable rack arm and the cables loaded onto the arm. Accordingly, reinforcements, such as glass fibers, that are longitudinally oriented will be helpful in supporting the load and resisting deformation. This may be achieved by using glass-reinforced plastic materials. The desired orientation may also be achieved by using wider gates in injection molding the pins. It has also been found during experiments that molding the pin with a reservoir, attached to the end of the pin opposite the gate with a small orifice, causes additional plastic flow and helps to orient the fibers during the injection molding process.

As discussed above in the background section, underground cable racks face several constraints for successful service. One of these constraints is that the stanchions or posts generally include penetrations in both the stanchions and the arms so that the stanchions or posts may be attached to the walls or surfaces of the manholes or other underground installations in which they are placed. If cable rack arms are not integral with the stanchions, there are then more penetrations so that the rack arms may be installed, to hold cables for power or communications. Each such penetration may be considered as a stress concentrator, a point in the structure at which stresses will be more likely to cause failure.

In molded posts or stanchions, the effects of the stress concentrators may at least be minimized by molding in the penetrations or holes, so that the well-known "skin-effect" of plastic materials will apply, lessening the effect of the stress concentration. The skin-effect of as-molded plastics means simply that there is a barrier layer of resin on the surface, resistant to infiltration of water and other contaminants. Embodiments disclosed herein may mold in a number of important features to take advantage of the skin effect and to make the stanchions and saddles as useful as possible.

Discussion of Cable Rack Arms and Stanchions

Embodiments are depicted in FIG. 1, which depicts an underground cable installation 10 with two composite pultruded C-channel stanchions 16 secured to a concrete wall 12 with bolts (bolts not visible in FIG. 1). This cable installation may reside in an underground manhole, tunnel or vault, used to redirect, connect and splice underground power, communication and control cables. These manholes, tunnels and vault are also used to house transformers, regulator banks and various types of control equipment used with the power, communications and control cables.

The stanchions 16 of FIG. 1 are each used to mount two long cable rack arms 18 and a shorter cable rack arm 20. In one embodiment, stanchions 16 are 42 inches long. In other embodiments, the stanchions are 24 inches or 60 inches long. Other longer or shorter lengths may be used, up to about 234 inches long, with a number of flange holes and with flange hole spacing as desired. In one embodiment, long cable rack arms may be about 30 inches long, i.e., an effective length, the length measured from the outermost surface of the stanchion. In other embodiments, the long cable rack arms may be 18 or 23 inches long. In one embodiment cable rack arm 20 is about 16 inches long. In another embodiment, cable rack arm 20 may be about 13 inches long. Other lengths may be used.

Cable rack arms 18 have four position placers or saddles 26 on the top portion of the rack arm for cradling power cables 14. Cable rack arms 20 each have two position placers or saddles 26 on top for cradling the cables. Of course, other embodiments may have only a single mount or may have additional mounts, such as an arm with four or five saddles. Further, some applications may require that the top surface of the arm be flat. One advantage of the embodiments depicted herein is that the mounts or saddles are made and assembled separately, and thus the number of saddles may be tailored to each arm or installation. In one embodiment, the saddles are about 5.5 inches long, measuring the inner distance at the top or open part of the saddle; in another embodiment, the saddles are about 9 inches long. Other lengths and sizes of the saddles may be used.

Figure 2:
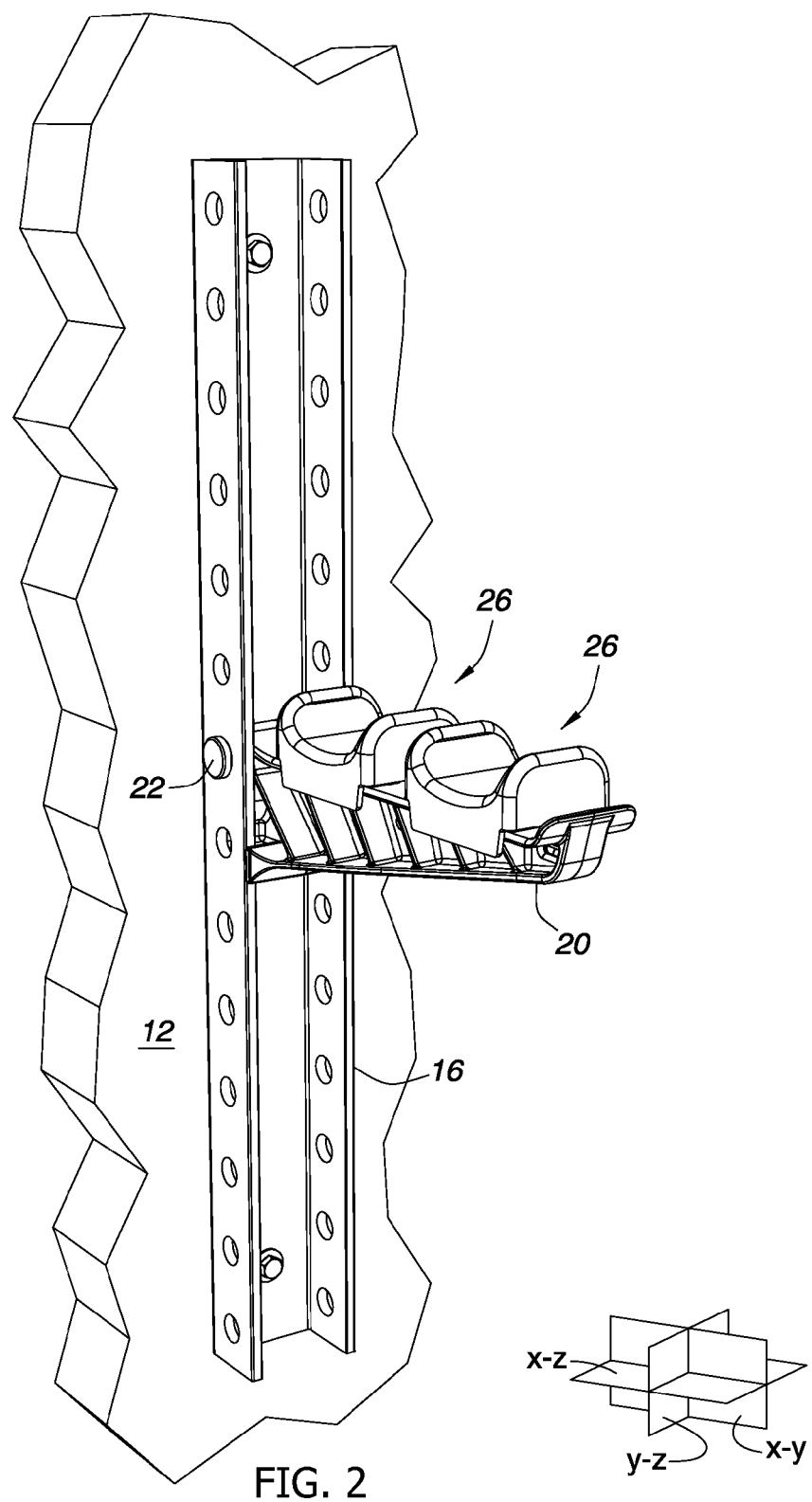
FIG. 2 is a closer perspective view of one of the embodiments of FIG. 1.
Figure 3:
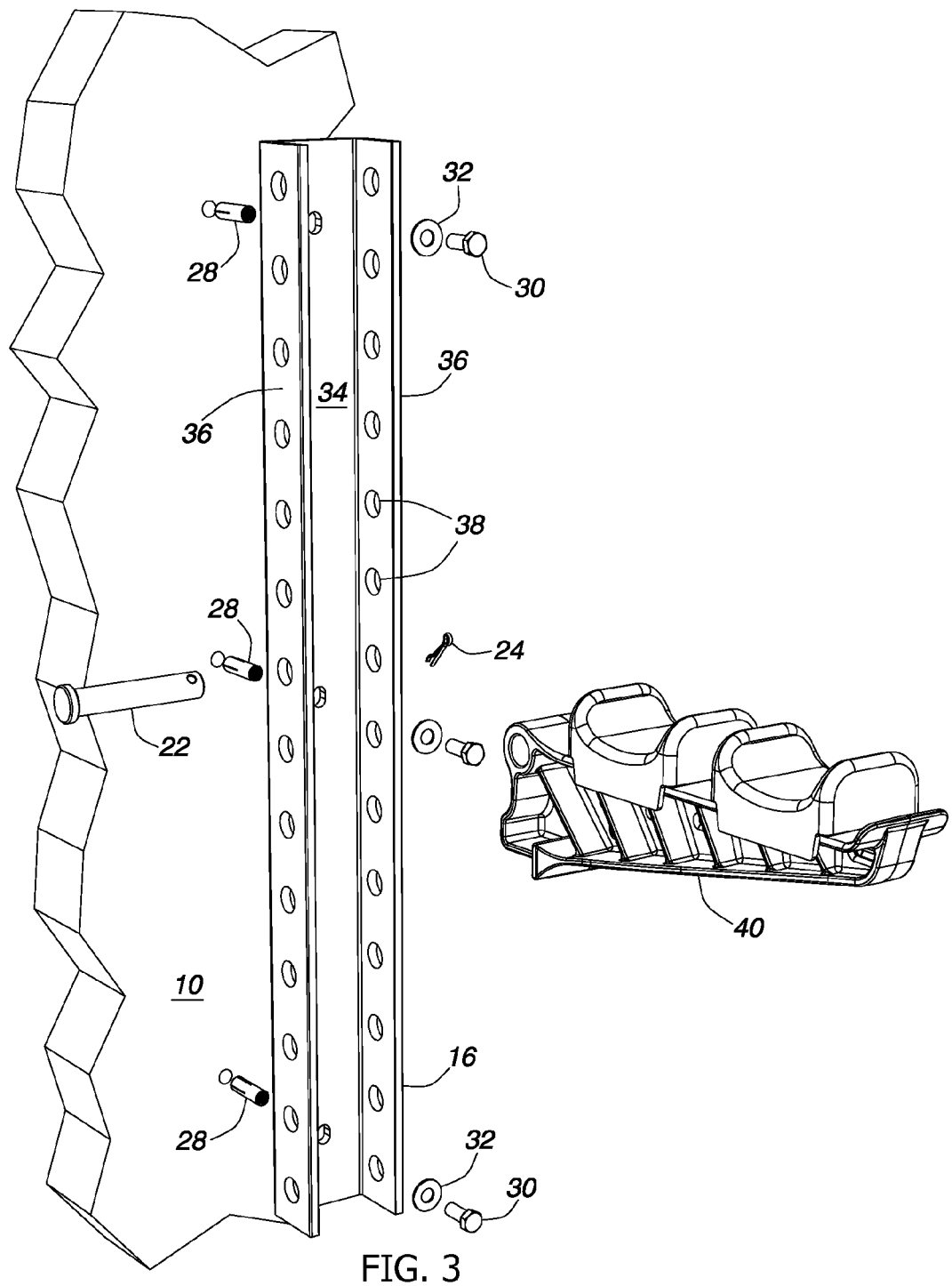
FIG. 3 is an exploded view of the embodiment of FIG. 2.

FIGS. 2-3 depict an underground installation of the pultruded composite stanchion 16 secured to a concrete wall 12 with three anchors 28, bolts 30 and washers 32. A short cable rack arm 20, as shown in FIG. 1, mounts to the stanchion 16 with a composite cross pin 22 and is secured by a removable cotter pin 24. In one embodiment, the cross pin 22 is made from glass reinforced rod made with vinylester or polyester resin. In one embodiment cotter pin 24 is made from stainless steel.

In this installation, rack arm 20 includes two saddles 26 for cradling power cables (shown in FIG. 1). A coordinate system showing three mutually-perpendicular planes is introduced in FIG. 2 for orientation: plane X-Z is a horizontal plane parallel to ground; plane X-Y is a vertical plane along a length of the cable rack arm; and plane Y-Z is a vertical plane aligned with the stanchion and perpendicular to the X-Y plane.

Figure 4:
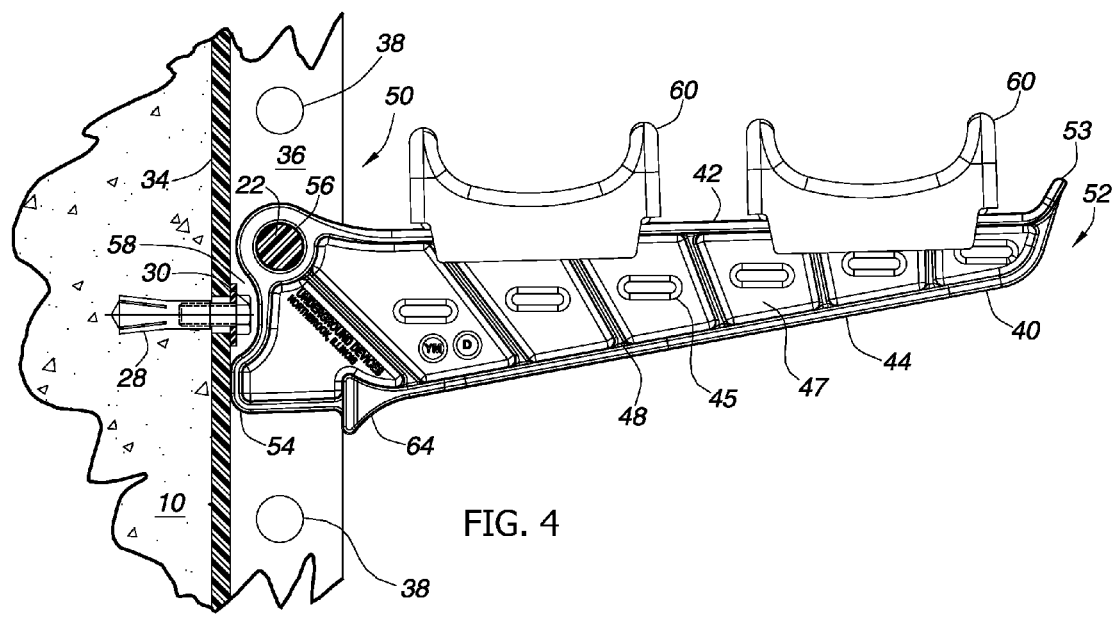
FIG. 4 is a side, partial cross-sectional view of the arm and saddles of FIG. 2.

Additional details of a mounted stanchion and a cable rack arm embodiment are disclosed in FIG. 4. Cable rack arm 40 includes a top or upper portion 42, a bottom or lower portion 44, an inner or proximal portion 50 and an outer or distal portion 52. The middle portion or web 47 of the cable rack arm includes elongated orifices 45. The orifices may be used for cable ties to secure the power cables to the saddles 60. The web 47 also includes a plurality of ribs 48. The ribs provide stiffness and strength to the cable rack arm, while minimizing added weight. In one embodiment, ribs 48 are generally rectangular in shape, with generous radii where the ribs meet the web; in another embodiment, the ribs may be trapezoidal, wider near the base where the ribs meet the web and narrower as the ribs extend outward away from the web. When installed, the cable rack arm top is intended to be generally horizontal, with a slight upward pitch, a few degrees. If installation is desired without saddles, power and communication cables may then rest atop the cable rack arm without rolling off the cable rack arm. In addition, the distal end 52 of the cable rack arm may have a tip 53 with an upward pitch, as shown. In one embodiment, the upper portion of the cable rack arm is formed at a positive angle to horizontal for better retention of the cable on the cable rack arm.

The upper and lower portions 42, 44 of the cable rack arm are somewhat wider than the web portion 47 (see FIGS. 6-7 below). The upper and lower portions may be considered the flanges of the cable rack arm. Cable rack arm 40 mounts to the stanchion through cross-pin orifice 56 and cross pin 22 (shown in cross-section). Cross pin 22 mounts to the stanchion using orifices 38 in stanchion flanges 36. The heel 54 of the cross rack arm 40 abuts stanchion web 34. Lower portion 44 includes a cross-wise gusset 64 which abuts the outer surfaces of stanchion flanges 36. In this embodiment, hollow 58 near the proximal end 50 of the cable rack arm 40 provides space for the head of mounting bolt 30.

The above view of FIG. 4 depicted the installation with no load, while FIG. 5 depicts the same installation under load, the load applied to the outer saddle 60. In this exaggeration, the load reacts through the cable arm 40, applying a tensile load through the cross pin 22 and a compressive load through the heel 54, the load then passed to the anchors 28. This results in bowing of the stanchion, as shown in a bowing of the web 34. Gusset 64 helps the situation by also applying a portion of the load to the flanges 36 of the C-channel stanchion.

A rear perspective view of the cable rack arm 40 with saddles 60 is shown in FIG. 6. In this view, ribs 48 are seen to extend a little less than the full width of upper and lower portions 42, 44, while cross-wise gusset 64 extends further than the upper and lower portions. This extra width allows proximal or rear portion 50 to fit between the flanges of a stanchion, while allowing gusset 64 to abut the appropriate outer ends of the flanges 36. Hollow 58 is seen to be a smooth, continuous hollow, allowing for ease of molding the cable rack arm and with no sharp turns, deep penetrations or abrupt transitions. In both FIGS. 5 and 6, hollow 58 is provided between the cross pin orifice area and the heel 54.

Additional details of the gusset 64 are shown in FIGS. 7 and 8. In FIG. 7, shown from a perspective view from the distal end 52 of the cable rack arm, gusset 64 abuts the outer surfaces 37 of the flanges 36 of stanchion 16 when the stanchion is mounted with cross pin 22. As seen in the closer view depicted in FIG. 8, this embodiment of gusset 64 is not symmetrical. Upper portion 64a has a slight upward curvature as it approaches the flange outer surface 37, while the lower portion 64b has a more pronounced downward curvature, providing additional mass. It is believed that this configuration results in additional strength and stiffness in this area, increasing the cantilever strength of the cable rack arm and better distributing the load to the stanchion from the gusset and heel portion of the cable rack arm.

Saddles for Holding Power Cables

The above discussion has focused primarily on the cable rack arms and stanchions for mounting the cable rack arms. As noted previously, these devices are used in underground applications for power and communications cables routing. This disclosure will now focus on the saddles that were mentioned above. Saddles are used to help retain power cables on cable rack arms while minimizing friction between the saddle and the cable. Some power cables are made with a tough outer coating of XLPE (cross-linked polyethylene), these cables may not need saddles. Cross-linking polyethylene results in much improved properties, including high-temperature properties, impact and tensile strength, scratch resistance, and resistance to brittle fracture. As noted above, the cable rack arms discussed herein are secured to the stanchions with only a single cross pin, allowing the arm to pivot and angle up when pulled up by a possible cable fault.

The saddles which were mentioned above are disclosed more fully in this section. The saddles disclosed herein include a number of components. The intent is to assemble the saddles from their component parts and then to snap-fit the saddles onto the cable rack arms. Once assembled, the saddles are intended to be removed only with great difficulty. In other embodiments, the saddles may be more removable. As known to those with skill in assembly arts, the difference may lie in the details of the snap-fit members used. A snap-fit assembly as used herein typically involves assembling two parts. One of the parts includes a "hook" on the end of a cantilever beam; the other part intended for assembly includes a flat surface or an undercut to receive the hook. The cantilever beam and its terminal hook, portions of a first part, are bent past an upper surface of a second part, stressing the cantilever beam. When the hook clears the upper surface, the cantilever beam is able to relax, and the inner portion of the hook grasps the flat surface of the second part. If the radius on the end portion of the hook is sharp, it is possible that the joined parts cannot be disassembled without destroying the parts; if the radius on the end portion of the hook is generous, it may be possible to easily disassemble the parts. Of course, the flat surface or the undercut may also be proportioned with the design of the hook and beam for ease or difficulty of disassembly, i.e., the hook extends only a short distance onto the mating part so that disassembly is easily achieved. These same principles hold for the snap-fits that are used to assemble the dampener supports (discussed below) to the inside of the housings that comprise the saddles discussed herein.

One embodiment of the cable arm saddle is depicted in the exploded views of FIGS. 9-10. FIG. 9 is a top perspective exploded view, while FIG. 10 is a bottom perspective exploded view of the identical saddle embodiment 60. Parts of the saddle include a housing 72, a dampener support 74, a dampener 78 and an antifriction pad 84. The bottom or underside surface 85 of the anti-friction pad 84 is the part of the saddle in contact with the cable rack arm. In order for the anti-friction pad and the saddle to move along the length of the cable arm, anti-friction pad 84, or at least its bottom surface are desirably made of a plastic material having low friction, e.g., a low coefficient of friction. Such plastics were discussed above in the materials section and may include HDPE, PTFE or UHMW. Alternatively, the bottom surface 85 may be a low-friction coating, such as a coating of PTFE or UHMW, while the remainder of the anti-friction pad may be molded from a lower-cost material.

The anti-friction pad also includes two cantilever beams 86 at opposite ends of the anti-friction pad, the ends taken along an X-Y vertical plane, as discussed with respect to FIG. 2. The ends are in the direction of the principal axis or length of the cable rack arm. Thus, the anti-friction pad 84 and the saddle 60 are designed for movement back and forth along the length of the cable rack arm. At the end each of the cantilever beams is an engagement hook 88. In this embodiment, the end portion of the hook is formed with a sharp radius, the hook intended for difficulty of disassembly once the hook is joined to the flat mating surface in the notch 76 of dampener support 74.

Between the dampener support 74 and the anti-friction pad 84 lies a dampener 78. The dampener is intended to absorb shock and vibration that occur in the manhole and otherwise would be passed to the cable via the dampener supports 76 and housing 72. In this embodiment, the dampener includes notches 76, 82 for clearance of cantilever beams 86. The dampener may be a strong and flexible material, strong so that the dampener may withstand many thousands or millions of shock cycles, and flexible so that the dampener absorbs the shock and minimizes the shock passed to the cables which are mounted on the saddle. Examples may include neoprene, nitrile, polyurethane or silicone elastomer. In one example, the elastomer may have a hardness in the range of Shore A 30-70 durometer. Elastomers or materials having other durometers may also be used. In order to provide additional flexibility, dampener 78 may include voids or holes 80 to allow for greater internal movement and flexibility of the dampener material.

The dampener support 74 may be made as two parts as shown, or may be made as a single piece. The dampener support 74 is then assembled to the underside 90 of the saddle 60, as seen in FIG. 10. This more detailed view of the underside 90 also depicts the underside bottom 91 of the saddle, along with side skirts 92, front and rear portions 95, 96 of the saddle, and internal ribs 98. Ribs 98 alternate with smaller and larger voids 97 among the ribs and between the ribs 98 and the front and rear portions of the saddle underside 90. The inside of the skirts 92 act as rather stiff cantilever beams with terminal hooks 93, of which only one is visible in FIG. 10.

The saddle is then assembled after the individual parts are manufactured. The dampener support or dampener support portions may be spin welded to the underside bottom 91 and ribs 98 of the saddle. Other possible methods of assembly include adhesive bonding, ultrasonic welding, solvent bonding, or mechanical assembly, such as with fasteners, e.g., screws. Any suitable method may be used, so long as the bond between the parts is very strong. It is contemplated that this assembly will be subject to many cycles of shock and vibration, and that proper assembly and bonding is essential to the proper dampening function of the saddle.

One having skill in mechanical arts may notice that it is not necessary to provide a separate dampener support. That is, the underside 90 of the saddle may be made without the several voids observable in FIG. 10, so that underside bottom 91 extends further, perhaps encompassing and including all ribs 98, leaving only a void for engagement of the cantilever beams 86 and hooks 98. Leaving aside the difficulty of providing internal undercuts, this solution has not been followed because of its practical difficulties. Using this method would require a great deal more expensive plastic material, i.e., enough additional plastic material to fill all the voids. In addition, the saddle would likely include unsightly sink marks on its opposite or top side, i.e., the side visible to customers and users. As is well known to those in plastic molding arts, wall thicknesses should be equal to each other to prevent sink marks, which will occur on the opposite side of the thicker parts. In addition, if very thick walls are used, the cycle time for the part (the largest part, the saddle housing) will have to be increased to allow the injection-molded plastic to cool. This also adds to the cost of the part. Since the saddle housing is clearly the largest and most complex portion of the saddle, the cost increase would likely be significant.

Once the dampener support 74 is welded or adhered to the saddle bottom 91, dampener 78 is placed atop the dampener support 74 and the anti-friction pad 84 is snapped in place, securing the hooks 88 to the underside of the dampener support in the vicinity of the clearance notches 76 via the flexing cantilever beams 86 of the anti-friction pad 84. When this is accomplished, the saddle 60 is now assembled into a single piece. Visible from the inside bottom view of FIG. 10 will be only the inside view of the front and back 95, 96 and the extremities of the insides of side skirts 92 and terminal hooks 93. The underside 94 of terminal hooks 93 will engage with the underside of cable rack arm upper portion 42, as better seen in FIG. 14. The vibration dampener 78 is designed to fit substantially within the saddle 72. As may be seen in the drawings, the vibration dampener will be covered by the side skirts 92 of the saddle. However, as seen in FIGS. 11-12, it is possible in some instances that a portion of the height of the vibration dampener may extend beyond the front 95 and rear 96 of the saddle to a small degree. Thus, vibration dampener 78 resides "substantially" within the saddle.

It will be noted that side skirts 92 also act as the cantilever beams for snap-fit hooks 93. Movement of the side skirts is very limited, since the sides skirts are molded to the front and back of saddle housing 72. The cantilever beams/skirts 92 and hooks 93 are provided at a right angle to the cantilever beams and hooks of the anti-friction pads 84. In order to assemble the saddle to the cable rack arm, a user will place one side of the saddle on a side of the cable rack arm, and then push downward on the opposite side of the saddle, using the outside of the hook itself as a cantilever beam to clear the inside of the saddle past the wider upper portion of the cable rack arm, until the hook clears and then the side of the saddle snaps back, causing hook underside 94 to clear the lower surface of the cable rack arm upper portion. As noted, once this embodiment of the saddle is assembled, it will be removed only with great difficulty, perhaps only by destroying the saddle. In another embodiment, the snap fit may be reversible, so that the saddle may be reversibly joined to the cable rack arm.

Workings and Clearances of the Saddle on a Cable Rack Arm

FIGS. 11-14 depict how the internal parts of the saddle work with each other and with the cable rack arm to dampen vibrations and also to allow movement of the saddle along the cable rack arm. FIGS. 11-12 depict the internal workings of the vibration dampener, while FIGS. 13-14 depict the parts and clearances of the saddle with respect to the cable rack arm.

FIG. 11 is an orienting view for the more detailed view of FIG. 12. In FIG. 11, a cross section includes cable rack arm 40, taken from the distal end 52 and including two saddles 60 which have been snap fit onto the cable rack arm. FIG. 12 depicts internal parts of the saddle, except for the bottom left portion, which depicts a cross section of the web or gusset portion 47 of the cable rack arm, and a top surface of cable rack arm 40 in the right front of the figure. Beginning at the top of FIG. 12, the apex 71 of the saddle front portion is seen, with a large void or clearance 73 within the front portion of the saddle housing 72. On the left portion of the figure, and starting from the top, within the saddle housing 72, lie dampener support 74, dampener 78 with holes, and anti-friction pad 84. Integral with anti-friction pad 84 is cantilever beam 86 and hook 88.

Dampener support 74 is welded or otherwise fixedly assembled to the underside of saddle housing 72 and will not move. Dampener 78 is expected to move and flex in an up- and-down direction as shown in FIG. 12, as will anti-friction pad 84. Thus, the cantilever beam 86 and hook 88 will also move in an up-and-down direction. Accordingly, void 73 provides vertical clearance for vertical movement of the anti-friction pad 84. There is also horizontal clearance or space 87 between the visible surface of cantilever beam 86 and the inside of the front portion of the saddle housing 72. This clearance will allow slight tilting of the saddle in the X-Y plane, that is, along the length of the cable rack arm. There is also horizontal space or clearance 86a between the dampener 78 and the cantilever beam 86.

As shown in FIG. 12, there may be vertical clearance between the top of the dampener support 74 and the bottom or engaging surface of snap fit hook 88, as shown. When the saddle is under load, e.g., from power cables, the saddle will weigh down and deflect the dampener 78, causing increased clearance between the dampener support 74 and hook 88. There is also clearance or space 89 between a bottom surface of the saddle front 96 and the top surface of cable rack arm 40.

FIG. 13 is an orienting figure across the width of cable rack arm 40 with mounted saddles 60, with a more detailed view provided in FIG. 14. In this view, cable saddle housing 72 with skirts/cantilever beams 92 has been assembled to cable rack arm 40, with the snap-fit hook 93 engaging an underside of the upper portion 42 of the cable rack arm. In this view, dampener 78 is seen supported by anti-friction pad 84. There is a vertical clearance 75 between the top portion of anti-friction pad 84 and the bottom of the underside of saddle housing 72, and there is also vertical clearance 75a between the bottom surface of cable rack arm upper portion 42 and the engaging surface of hook 93. This clearance will be more pronounced when the saddle is under load and the dampener 78 is reduced in thickness, moving saddle side skirt/cantilever lug 92 downwards. A horizontal clearance 79 is also seen between the outer wall of the anti-friction pad 84 and the inner wall of the side skirt/cantilever beam 92. There is also a horizontal clearance 81 between the inner wall of the skirt/ cantilever arm 92 and the outer surface of cable rack arm 42. These clearances allow for movement of the saddle with respect to the cable rack arm, in particular with respect to the engagement portion of the cable rack arm, upper portion 42.

Discussion of Reinforcements for Pultruded Stanchions

As discussed above, a useful embodiment disclosed herein is a nonmetallic stanchion that is pultruded with a cross section in the general shape of a capital "C." FIGS. 19-20 depict a cross-sectional view of the "C" channel stanchion. This embodiment of the "C" channel stanchion is nonmetallic. After the basic "C" channel has been pultruded, it is sawed to length and the holes for mounting it to a wall and the holes for attaching the arms are machine routed and/or drilled as required. In one embodiment, the nonmetallic material used in fabricating the "C" channel, by weight, is 44.5% polyester resin and 55.5% glass fiber. The glass fiber includes 33% unidirectional fiberglass roving (roving), 17% continuous filament glass fiber mat (CFM), 5% fiberglass cross layered knitted apertured mat (CLKM) and 0.5% synthetic surfacing veil (veil). The type of glass filament used in the roving, CFM, and CLKM is commonly known as E-glass. Other proportions may be used. The CFM is similar to a spun-bonded, non-woven reinforcement. In other embodiments, a standard woven (warp and weft) reinforcement mat may be used.

During the pultrusion operation, the roving, CFM, CLKM, and veil are completely wetted and saturated with the polyester resin. The polyester resin is the component that binds the fiberglass together forming a strong nonmetallic reinforced composite "C" channel stanchion. It is understood that other resins and other reinforcement fibers may be used. The roving is similar to Owens Corning fiberglass product number 399-113 yield and the CFM is similar to Owens Corning product number M-8643-2 oz/sq. ft and M-8643-3 oz/sq. ft. from Owens Corning, Granville, Ohio, U.S.A. The veil is similar to "NEXUS" veil from Precision Fabrics Group, Inc., Greensboro, N.C., U.S.A. The roving contributes longitudinal tensile strength and flexural strength. The CFM contributes strength in both the longitudinal and transverse directions. The veil provides a resin-rich surface for UV resistance and hand-friendliness.

The polyester, roving, CFM, and veil components described above have been used to pultrude and deploy a relatively small quantity of nonmetallic TEE-bar and "L" stanchions in recent years. These stanchions had insufficient strength and during the course of the work described herein, it was determined that a stanchion with higher load capacity was needed. In particular it was noted that the distribution of the roving and the mat throughout the resulting structure was not well controlled. Accordingly, the inventor developed a fiberglass cross-layered polyester yarn knitted apertured mat (CLKM) for placement in the stanchion during the pultrusion operation. Since the mat is cross-layered, one layer is oriented in the direction of the pultrusion, while the opposite layer is oriented transverse, about 90°, to the direction of pultrusion. In other embodiments, the transverse layer may be oriented up to plus or minus 15 degrees to the transverse direction.

FIG. 15 is the top view of a swatch of CLKM fabric 100. The CLKM fabric has 6.5 longitudinal tows 101 of fiberglass per inch and 6.5 transverse tows 102 of fiberglass per inch. The tows 101,102 are knitted together with polyester yarn 103. FIGS. 15, 16, 17 and 18 reveal in detail that the transverse tows 102 form one layer and the longitudinal tows 101 form a distinct second layer. Each tow 101, 102 is an untwisted bundle of 2,000 each (450 yield) 0.0166 mm (0.000654 in) diameter continuous glass filaments. The open channels 104 between the longitudinal tows and the open channels 105 between the transverse tows combined with the apertures 106 that penetrate through the CLKM fabric permit the polyester resin to wet-out and flow through the CLKM fabric. The CLKM fabric is pulled through the pultrusion die in the direction shown by the arrow 107. While not being bound by any particular theory, it is believed that the layered structure allows greater penetration of the resin between layers and between and within tows in each layer, as well as within the discrete "windows" or apertures of the knitted reinforcement between each tow of each layer.

A cross-section of the "C" channel stanchion showing the reinforced polyester composite after it exits the pultrusion die is shown in FIGS. 19 and 20. In one embodiment, the structure is as follows. Two overlapping veils 108, 109 cover the outer surface. Two pieces of CFM 111, 112 are placed immediately inside the veil. One piece of CLKM 114 is placed at the center of the "C" channel thickness. One piece of CFM 115, 116 is placed on each side of the "C" channel thickness half way between an outer surface of the CLKM 114 and inner surface of the outer CFM 111, 112. In one embodiment, the tows of roving, respectively 62 ea, 65 ea, 67 ea and 70 ea tows, are evenly distributed in compartments 117, 118, 119 and 120 respectively. As stated previously the veil 108, 109 constitutes 0.5% by weight of the "C" channel composite, the CFM 111, 112, 115, 116 is 17%, the CLKM is 5% and the roving is 33%. The 44.5% balance is the polyester resin which completely wets-out, saturates and adheres to all surfaces of the veil, CFM, CLKM, and roving.

The fiberglass-reinforced polyester composite pultrusion thus fabricated has increased transverse strength in the corners 121, 122 because the knitted yarn controls the distribution of the glass fiber tows. A non-metallic pultruded stanchion made with the described corner reinforcements will have increased rigidity and strength, and because the position of the glass reinforcement is controlled, will also have a more reliable strength and stiffness.

One novel feature in the above described pultrusions that results in the increased transverse strength of the cable arm support stanchion is the inclusion of at least one fiberglass cross layered knitted apertured mat (CLKM) in which the tows and layers are restrained by a knit mesh. CLKM is the preferred fabric. The fiber or yarn used for the knit mesh may be polyester, cotton or other fiber. While a knitted holding structure is useful, other forms may be used, such as a stitched, purled, or even a woven form, so long as the additional fibers constrain the individual tows and layers into an integral structure. Other variations of the CLKM may also be used, in which the fiberglass fabric itself is woven, knitted or stitched.

There are many possible embodiments of the present disclosure, of which only a few have been described herein. It is intended that the foregoing detailed description be regarded as illustrative rather than limiting, and that it be understood that it is the following claims, including all equivalents, that are intended to define the spirit and scope of this invention.

What is claimed is:

1. A cable rack arm, comprising:
 an upper flanged portion formed between a proximal end and a distal end of the cable rack arm, the upper portion adapted for holding cables and conduits for power and communications;
 a lower portion opposite the upper portion, the lower portion further including a gusset;
 a web connecting the upper flanged portion to the lower portion; and
 an interface near the proximal end, the interface including:
 i. a heel for mating with a stanchion for supporting cable loads, the heel comprising a continuous surface spanning a width of the cable rack arm;
 ii. an orifice for mounting the cable rack arm to the stanchion, wherein an area surrounding the orifice forms a continuous surface connected to the upper flanged portion and spanning a width of the cable rack arm from a left outer surface to a right outer surface of the cable rack arm; and
 iii. the gusset formed perpendicularly to a length of the cable rack arm for mating with the stanchion, the gusset spaced apart from the heel.

2. The cable rack arm of claim 1, wherein the gusset has a curvature and a lower portion of the gusset has a greater curvature than an upper portion of the gusset.

3. The cable rack arm of claim 1, further comprising the stanchion.

4. The cable rack arm of claim 1, wherein the cable rack arm is made from plastic.

5. The cable rack arm of claim 1, further comprising a plastic saddle.

6. A cable rack arm, comprising,
 an upper flanged portion formed between a proximal end and a distal end of the cable rack arm;
 a lower portion opposite the upper portion, the lower portion further comprising a gusset placed distal to the proximal end and formed perpendicularly to a length of the cable rack arm, the gusset adapted for mating with flanges of a stanchion for supporting cable loads, the gusset formed between the distal and proximal ends of the cable rack arm;
 a web connecting the upper flanged portion to the lower portion; and
 an interface on the proximal end for mounting the cable rack arm to the stanchion, the interface including:

i. a heel for mating with the stanchion, the heel comprising a continuous surface spanning a width of the cable rack arm;
ii. an orifice for mounting the cable rack arm to the stanchion, wherein an area adjacent the orifice forms a continuous surface on the proximal end spanning the width of the cable rack arm; and
iii. a hollow area between the heel and the surface adjacent the orifice, the hollow area formed between the heel and the surface adjacent the orifice, wherein the heel, a surface of the hollow area and the surface adjacent the orifice have a general shape of a C-channel, the heel and the surface adjacent the orifice being the flanges and the surface of the hollow area inbetween acting as the web of the C-channel.

7. The cable rack arm according to claim 6, further comprising at least one non-metallic saddle adapted to snap-fit onto the cable rack arm with an integral snap-fit mechanism.

8. The cable rack arm according to claim 7, wherein the at least one non-metallic saddle comprises a vibration damping system within the saddle.

9. The cable rack arm according to claim 7, wherein the at least one non-metallic saddle comprises a vibration damping system including an antifriction pad, a dampener and a dampener support.

10. The cable rack arm according to claim 9, wherein the vibration damping system is adapted to snap fit within the at least one non-metallic saddle.

11. The cable rack arm according to claim 6, further comprising at least one non-metallic saddle adapted to snap-fit onto the cable rack arm with an integral snap-fit mechanism, wherein the snap-fit connection to the cable rack arm is non-reversible.

12. The cable rack arm according to claim 6, wherein the web further comprises a plurality of trapezoidal ribs between the upper flanged portion and the lower portion.

13. The cable rack arm according to claim 6, further comprising the stanchion, the stanchion made from a composite material.

14. The cable rack arm according to claim 6, wherein the gusset extends beyond a width of the upper flanged portion and the lower portion.

15. The cable rack arm according to claim 6, wherein the lower portion is flanged.

16. A cable rack arm, comprising:
an upper flanged portion formed between a proximal end and a distal end of the cable rack arm;
a lower flanged portion opposite the upper portion, the lower flanged portion further comprising a gusset formed perpendicularly to a length of the cable rack arm and placed distal to the proximal end, the gusset adapted for mating with flanges of a stanchion for supporting cable loads;
a web connecting the upper flanged portion to the lower flanged portion;
an interface on the proximal end for mounting to the stanchion, the interface comprising a smooth, continuous surface in a general shape of a C-channel with a protruding top portion for connecting to the stanchion, a protruding bottom heel and a hollow central area between the protruding top and the heel; and
a non-metallic saddle configured to snap-fit onto the cable rack arm.

17. The cable rack arm according to claim 16, wherein the upper flanged portion is formed at a positive angle to horizontal.

18. The cable rack arm according to claim 16, wherein for the interface on the proximal end:
i. the heel comprises a continuous element spanning a width of the cable rack arm;
ii. the protruding top further comprises an orifice for mounting the cable rack arm to the stanchion, wherein an area surrounding the orifice forms a continuous surface of the protruding top portion spanning the width of the cable rack arm; and
iii. the hollow area between the heel and the protruding top is formed between continuous, gently-sloped surfaces.

19. The cable rack arm according to claim 16, wherein the non-metallic saddle is configured for irreversible snap-fitting onto the cable rack arm.

20. The cable rack arm according to claim 16, wherein the non-metallic saddle is configured for reversibly snap-fitting onto the cable rack arm.

21. The cable rack arm according to claim 1, wherein the gusset is placed distal to the orifice.

* * * * *